May 15, 1928. 1,669,786
P. J. SCHWALBENBERG
DEVICE FOR CONTROLLING THE ENERGY SUPPLY OF INTERNAL COMBUSTION ENGINES
Original Filed March 8, 1922 4 Sheets-Sheet 1
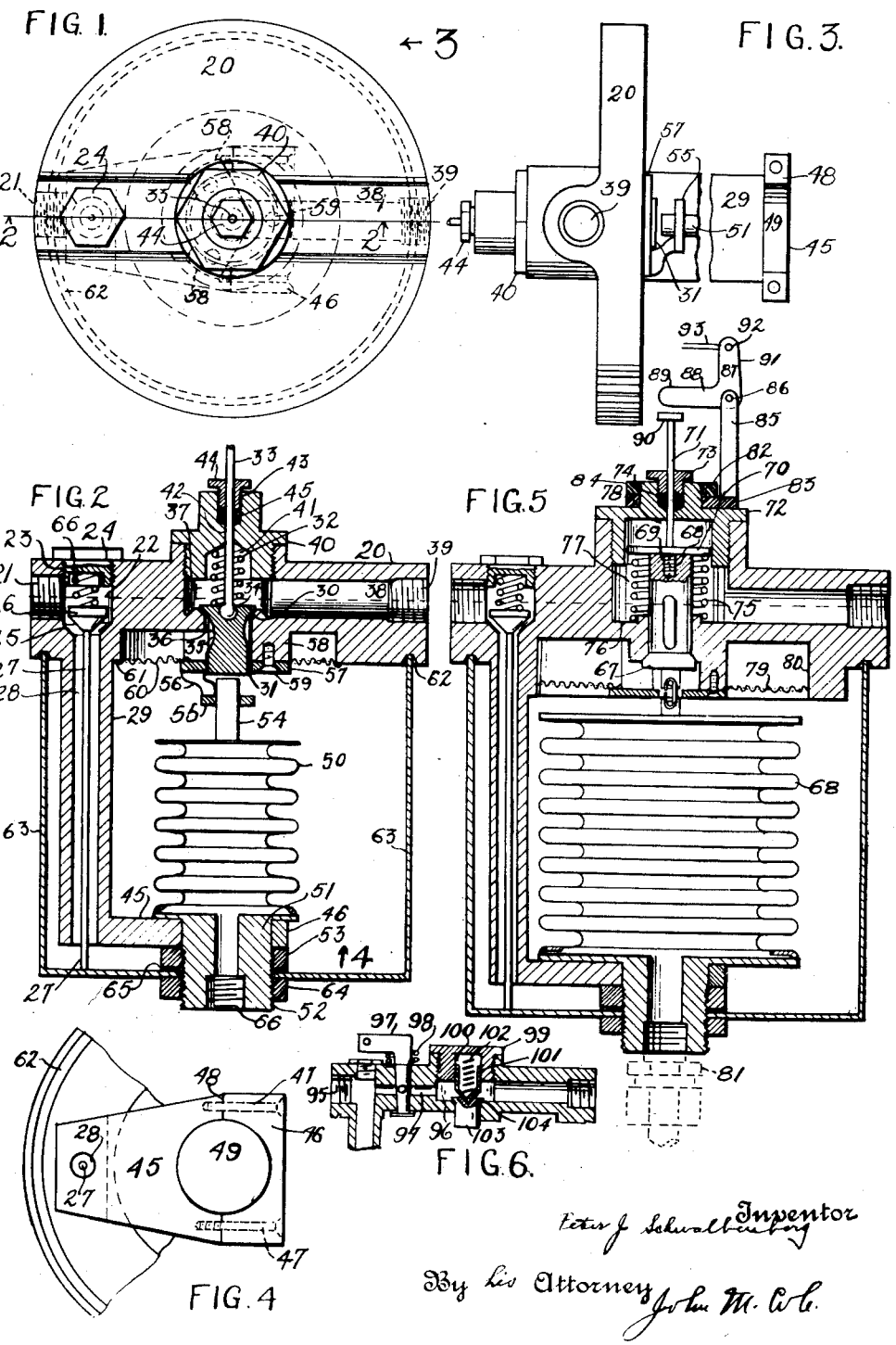

May 15, 1928. 1,669,786
P. J. SCHWALBENBERG
DEVICE FOR CONTROLLING THE ENERGY SUPPLY OF INTERNAL COMBUSTION ENGINES
Original Filed March 8, 1922 4 Sheets-Sheet 2
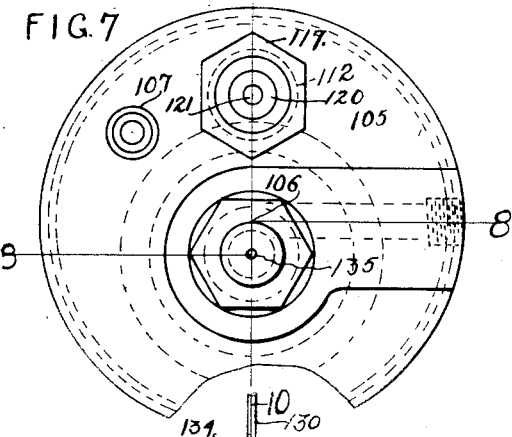
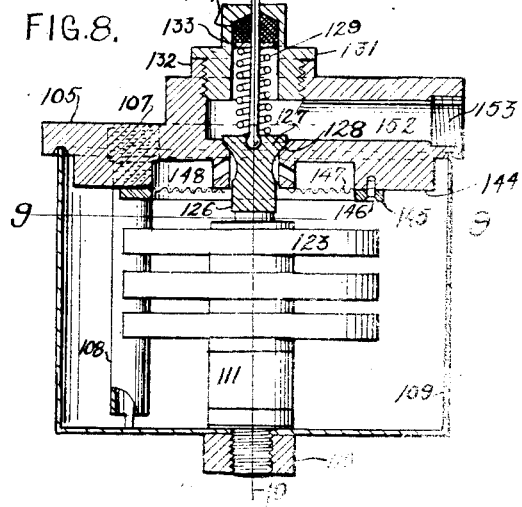
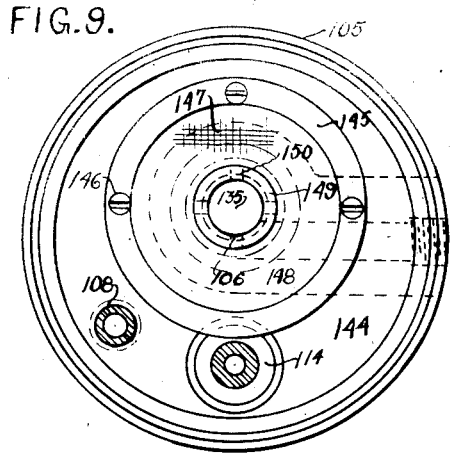
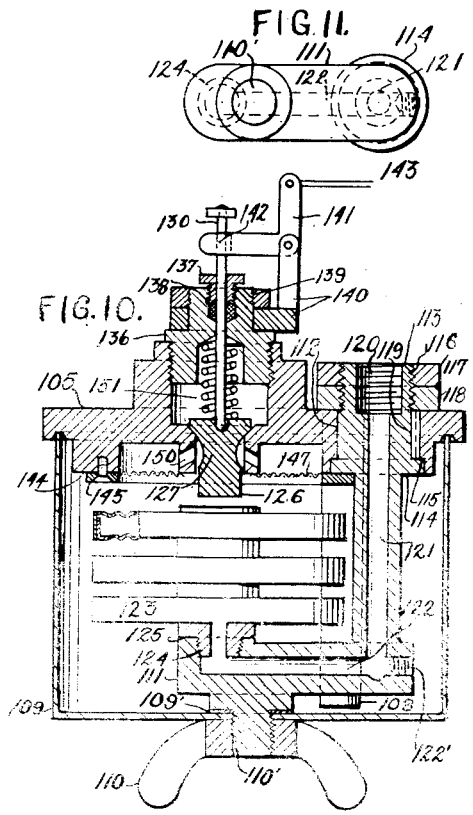
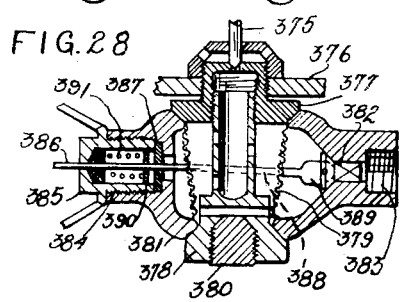

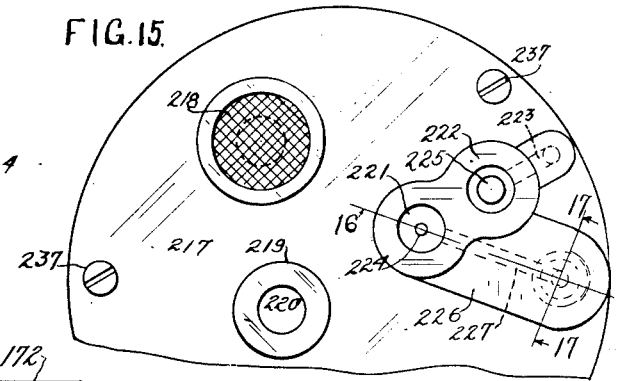

May 15, 1928.  1,669,786
P. J. SCHWALBENBERG
DEVICE FOR CONTROLLING THE ENERGY SUPPLY OF INTERNAL COMBUSTION ENGINES
Original Filed March 8, 1922    4 Sheets-Sheet 4
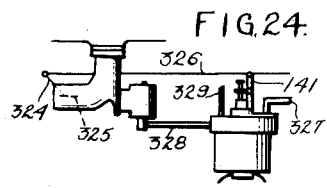
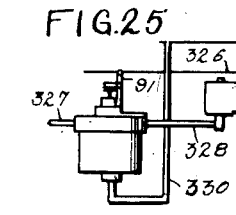
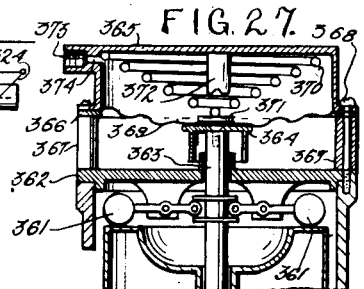
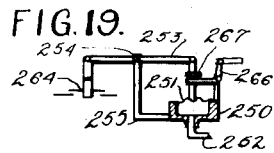
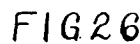
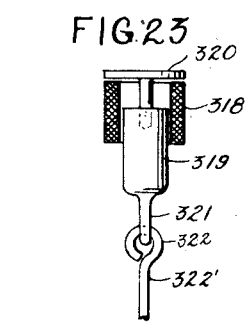
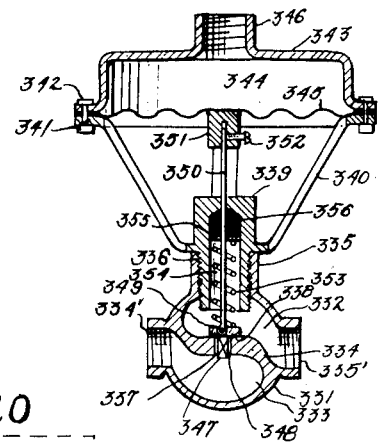
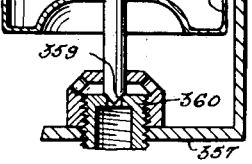
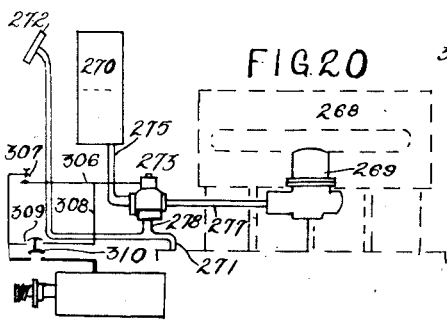
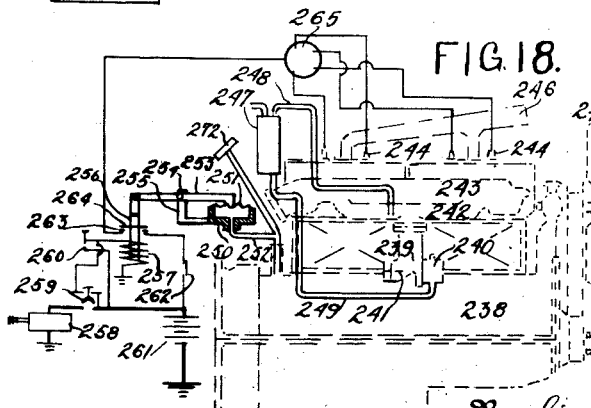
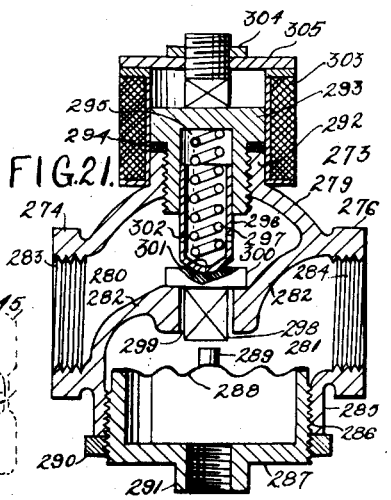
Inventor
Peter J. Schwalbenberg
By his Attorney
John M. Cole Patented May 15, 1928.

1,669,786

UNITED STATES PATENT OFFICE.

PETER J. SCHWALBENBERG, OF NEW YORK, N. Y., ASSIGNOR OF ONE-THIRD TO FRANK B. McKENNA AND ONE-THIRD TO JOHN M. COLE, BOTH OF NEW YORK, N. Y.

DEVICE FOR CONTROLLING THE ENERGY SUPPLY OF INTERNAL-COMBUSTION ENGINES.

Continuation of application Serial No. 542,148, filed March 8, 1922. This application filed May 8, 1922. Serial No. 559,125.

This invention relates to accessories for use with internal combustion engines for the purpose of automatically discontinuing the operation of the engine whenever a predetermined condition arises.

It is more particularly directed to a device which cuts off the fuel supply upon discontinuance of the operation of the engine, said device having incorporated therein a strainer for the fuel supply, and to means under the control of the operator for allowing flow at will.

Internal combustion engines generally have an electrical ignition system, and a supply of liquid fuel which is mixed with air in a carbureter before being introduced into the engine cylinders. Absence of igniting spark or of fuel stops the engine. Hence, if either one of these sources are disabled, when a predetermined condition in the engine or some device associated with it arises, the engine will stop. By operating as a result of a condition, which if continued would be detrimental or injurious to the engine, the accessory becomes a safety appliance. A disturbance in the cooling system, or in the lubricating system, is most likely to lead to injury to the engine, because, then the engine is not properly cooled and lubricated.

In many motor vehicles the gasoline is raised from a supply tank at the rear of the vehicle to a tank near the engine, by devices operated in response to the vacuum created in the engine cylinders when the engine is operated. These are known as vacuum tank systems. In other cars the main gasoline supply tank is near the dash. In either case the fuel flows under the influence of gravity through a conduit to the float chamber of the carbureter. In other cases the fuel is forced by air pressure, or otherwise, from a tank at the rear to the carbureter float chamber. In this chamber there is placed a valve actuated in response to the level of the fuel therein to admit fuel so as to maintain a predetermined amount of it in the chamber. Should the carbureter leak or flood, or the conduit or connections to the same leak, there is nothing to prevent the admission of fuel while the engine is idle, and continued leaking or flooding. The fuel may evaporate or drip out. In either case a loss results, and an increase in the fire hazard takes place. In the case of vacuum tank systems this leakage, if long continued, may drain the vacuum tank; and in this event it is impossible to start the engine until the gasoline supply has been replenished, either manually, or by cranking the engine by the self starter or otherwise.

On account of the very small passages in the carbureter it is advisable to strain the fuel before it is permitted to reach the float valve. The strainer is preferably so designed that the fuel flows upwardly through the gauze or chamois in order that the foreign matter, dirt, or water, is left behind without clogging the strainer.

Many of the forms of device to be hereinafter described may be substituted for the shut-off valve usually placed in the fuel line.

The stopping of the engine, of course, discontinues the operation of a pressure lubricating system, and the operation of the water circulating pump where one is used. The vacuum also disappears. These are only a few of the many sources which may be used to discontinue the fuel supply, or the ignition. A suitable fluid pressure responsive element may be employed with these "sources" as an operator for carrying out the functions referred to. The vacuum-responsive fuel-control system is capable of more universal application, while control from the pressure lubricating system will insure against burnt out bearings or damage to other parts of the engine.

An object of the invention is the provision of a fluid pressure responsive device controlled by the actuation of the engine for operating a valve in the fuel supply line.

More specifically an object of the invention is to provide a valve mechanism in the fuel supply line and operating means which, in response to change in fluid pressure brought about when the engine passes from the idle to the operating stage, opens the valve, the valve being automatically closed when the engine becomes idle.

Another object of the invention is to provide a normally closed valve mechanism in the fuel supply line with devices whereby the valve may be opened to permit fuel to flow when the engine is idle. These devices may be manually operable, or automatically operate preferably when the engine is being started.

Another object of the present invention is the provision of devices which are responsive to the discontinuing of the operation of the engine and/or the discontinuing of the proper functioning of some essential element thereof, which devices will shut off the fuel supply necessary for continued operation of the engine.

Another object of the invention is to associate with devices of the character above mentioned a strainer to prevent passage of foreign matter to the carbureter.

A further object is to so arrange the strainer and valve mechanism that the fuel is forced to flow upwardly through the strainer whereby the foreign matter, dirt or water are left in a cup or receptacle, from which they can be easily removed.

Other objects of the invention are apparent in the foregoing or will be apparent as the description proceeds.

The accompanying drawings are illustrative of certain of the many combinations of devices which may be used to accomplish the foregoing purposes and objects. In these drawings:

Fig. 1 is a top plan view of one form of device arranged for operation in response to the pressure in the forced fed lubricating system;

Fig. 2 is a section taken on the line 2—2 of Fig. 1;

Fig. 3 is an elevation taken in the direction of the arrow 3, parts being removed;

Fig. 4 is an elevation taken in the direction of the arrow 4 of Fig. 2, parts being removed;

Fig. 5 is a section similar to section of Fig. 2, illustrating the structure of Fig. 2 as modified for utilizing suction for controlling the valve;

Fig. 6 illustrates a modification using a by-pass valve;

Fig. 7 is a view similar to Fig. 1 of a modified form of device;

Fig. 8 is a section taken on the broken line 8—8 of Fig. 7;

Fig. 9 is a section taken on the line 9—9 of Fig. 8, parts being omitted;

Fig. 10 is a section taken on the line 10—10 of Fig. 8 but showing a different type of packing gland;

Fig. 11 is an inverted plan of a detail of Fig. 10;

Fig. 12 is a section of another modified form of device;

Fig. 13 is a top plan view of a valve casing shown in Fig. 12;

Fig. 14 is an elevation with parts in section of a valve adapted for use inside the vacuum tank;

Fig. 15 is a top plan view of a vacuum tank having connections for introducing the vacuum into the lower chamber;

Fig. 16 is a section taken on the line 16 of Fig. 15;

Fig. 17 is a section taken on the line 17—17 of Fig. 15;

Fig. 18 is an outline drawing showing an engine and an adaptation of devices for controlling the ignition from the forced feed lubricating system, the same being electrically connected with the self-starter;

Fig. 19 is a fragmentary view of the showing of Fig. 18, the device being arranged for control mechanically;

Fig. 20 illustrates an internal combustion engine with a fuel control valve interconnected with the pressure lubricating system.

Fig. 21 illustrates a form of valve adapted for actuation from the positive pressure source and for electro-magnetic opening when interconnected as shown in Fig. 20;

Fig. 22 illustrates a mechanical control device interconnected with the starter switch;

Fig. 23 illustrates a form of electromagnetic control which may be substituted for mechanical controls such as illustrated in Figs. 2 and 10;

Figs. 24 and 25 are schematic diagrams illustrating valve devices mechanically controlled along with the choke control of the carbureter;

Fig. 26 is a section through another form of vacuum controlled valve;

Fig. 27 illustrates a modified device wherein the float valve of a carbureter is placed under control of a vacuum responsive device; and Fig. 28 illustrates a fuel control valve designed to replace the universal coupling of the carbureter inlet.

Reference is now made to the form of structure illustrated in the Figs. 1 to 4, inclusive.

This form of invention has a main or principal member 20 which is preferably a casting. The member 20 is provided with a threaded hole 21 adapted to receive a coupling in the gas supply line. Adjacent to this hole the casting is provided with a vertical bore 22 threaded at 23 for the reception of a plug 24. The bore 22 is tapered at 25 to provide a valve seat for a movable valve member 26, whose stem 27 passes downwardly through an opening 28 in a depending lug 29. The member 20 is also provided with a centrally arranged valve seat 30 against which a movable shut off member 31 is adapted to be pressed by a spring 32, which spring surrounds a rod 33, loosely connected at the lower end 34 to the shut off member 31. The shut off member is recessed at 35 where it passes through an aperture 36 underneath the valve seat. Above the valve seat is a chamber 37 which communicates through a passage 38 with a threaded hole 39 in the member 20. This threaded hole is adapted to receive a coupling for the gas supply line for leading the gasoline to the carbureter.

A plug 40 is threaded into the member 20 above the chamber 37 and this plug is recessed at 41 to accommodate the spring 32. It is also provided with an aperture 42 through which the rod 33 passes and with a threaded hole 43 to accommodate a plug 44. Packing 45' is located between the plug 44 and the bottom of the hole 43. The plugs 40 and 44 are each provided with heads so that a wrench can be applied for tightening them. This is apparent from the plan view of Fig. 1.

The depending lug 29 is provided with a foot 45 to which is attached a member 46 by means of screws 47. The right hand end 48 of the foot 45 (as viewed in Fig. 4), is located so that an aperture 49 may be provided with its center directly underneath the center of the valve seat.

A pressure responsive element 50, which in this figure is illustrated as a metallic bellows, has a hollow stem 51 mounted in the aperture 49. The stem 51 is externally threaded at 52 and is fastened against the foot 45 by a nut 53. The upper end of the pressure responsive element is closed and is provided with a small stem 54 which extends adjacent the lower end of the shut off member 31. It passes through a ring 55 which is carried on arms 56, which in turn are connected with a ring 57. The ring 57 is fastened to lugs 58 by means of screws 59, a strainer 60 being interposed between the ring and the lugs. This strainer extends from the ring out to and over an annular shelf 61 on the lower portion of the member 20. In the drawing three lugs 58 are illustrated but it is obvious that any number could be used.

The lower surface of the member 20 has an annular groove 62 which may or may not be provided with packing, and a cup or receptacle 63 is adapted to fit into this groove, and to be held in place by a nut 64 carried on the threads 52 of the stem 51. Packing 65 is interposed between the upper surface of the bottom of the receptacle 63 and the nut 53.

The lower end of the hollow stem 51 is threaded at 66 to receive a coupling so that the interior of the pressure responsive element may be placed in communication with a suitable source of fluid pressure which is available when the engine is in operation. As above intimated, a suitable source for such a pressure is the forced feed lubricating system. The stem 27 of the valve 26 extends down to and engages with the bottom of the cup 63 and is held down by a spring 66 underneath the plug 24.

In assembling the device the valve member 26 and spring 66 are inserted through the bore 22. The shut off member 31 and valve stem 33 and spring 32, are placed in position whereupon the plugs 40 and 44 and the packing 45 are affixed. The screen 60 and ring 57 are then fastened in place and the stem 51 of the pressure responsive element is placed in the recessed end of the foot 45 and then the member 46 is fastened in place. The nut 53 will fasten the latter mentioned parts in place and the cup will be fastened in place by the nut 64.

The operation of this device is as follows:

The gasoline entering from the supply pipe (not shown) passes underneath the valve 26 through the opening 28 into the bottom of the cup 63. It fills the cup and if sufficient pressure is applied to the inside of the pressure responsive element 50, the fuel may flow upwardly through the strainer 60 and passage-way 36 into the chamber 37 and from this chamber it continues to the passage 38 into the fuel line leading to the carbureter. It will be noted that the fuel flows upwardly through the strainer 60 and therefore all foreign matter, dirt, or water will remain back in the cup 63. The cup may be removed by loosening the nut 64, which is made large enough to pass over the coupling device used for connecting with the forced feed lubricating system. When the cup is moved down the spring 66 moves the valve 26 against the seat 25 and cuts off the flow of fuel from the fuel tank.

It is, of course, obvious that the valve 26 might be omitted and reliance placed upon a shut off cock placed ahead of the valve mechanism here under consideration. It is also obvious that the strainer 60 may be a fine wire gauze strainer such as illustrated in the drawings, or it may be of chamois or other suitable material.

Fig. 5 illustrates a structure made along the general lines as the structure shown in Figs. 1 to 4. In this case the device is adapted for operation from the suction produced in the intake manifold of the engine. The differences will now be described, it being understood that the parts not referred to are substantially the same, except for size, as those discussed in detail above.

In the present case the shut off member 67 is pulled downwardly by means of a suction responsive device 68 here also illustrated as being of the so-called sylphon type. The connection between the shut off member 67 and the head of the metallic bellows is made flexible so that there will be some lost motion and the valve can be properly seated. The upper end of the shut off member 67 is shown as having a threaded hole 68 into which a stem 69 is provided. This stem has a disk 70 which extends beyond the shut off member and a stem 71 extending out through plugs 72 and 73 and packing 74 in a fashion analogous to that of the stem 33. A spring 75 is interposed between the disk 70 and the bottom 76 of the chamber 77. This spring is under compression and tends to hold the shut off member on its seat. The shut off member is guided by the disk 70 which loosely fits the chamber 78 in the plug 72. In this case a screen 79 is located so that it extends out to the walls 80 of an annular chamber instead of resting on a shelf as did the screen 60. This figure also shows in dotted lines a coupling 81 for connecting the device to the vacuum line which may be made directly to the intake manifold or into the vacuum line connecting to the vacuum tank. The operation of this device is substantially the same as the device shown in Figs. 1 to 4 except that it opens in response to the suction produced in the intake manifold by the operation of the engine.

As it is desirable to be able to open the valve so as to permit the flow of gasoline to the carbureter when the engine is being started, or is idle, especially when the operator desires to flood the carbureter, or when the carbureter has been drained or otherwise emptied, one convenient mechanical arrangement for permitting this operation is shown in Fig. 5. According to this illustration the plug 72 is threaded at 82. A ring 83 is held in place on the plug 72 by a nut 84 cooperating with the threads 82. The ring 83 has an upstanding arm 85 and in the upper end of this arm is pivoted at 86 a bell crank lever 87. The horizontal arm 88 of the lever has a head 89 which is adapted to engage the end 90 of the stem 71. The other arm 91 of the bell crank, which arm may extend in any convenient direction, is connected at 92 to a wire 93 by which the bell crank may be operated. It will be noted that the ring 83 may be clamped so as to place the arm 85 in any convenient position so that the wire 93 may lead to any desired operating means. A pull on the wire 93 will depress the stem 71 and thereby move the shut off member 67 off its seat. As the bell crank is not directly connected with the stem 71, the operation of the valve by the diaphragm does not operate the bell crank or any of its connections. When the bell crank has been moved away from the stem the valve operates without being loaded with the bell crank and devices connected with it.

In Fig. 6 is illustrated a modification of the structure of the preceding figures which structure avoids the use of a packing gland, but in which the fuel flow may be permitted independent of the operation of the diaphragm. The principal difference between the structures of Figs. 2 and 5 and the structure of Fig. 6, resides in providing a passage 94 which extends from the inlet 95 into the chamber 96. A shut off cock 97 is carried in the main casting in a position to cut off communication between the entrance passage 95 and the chamber 96. A spring 98 tends to hold this shut off cock in closed position. Instead of using an apertured plug and packing gland such as is shown in Figs. 2 and 5 a plain plug 99 is provided, which plug is threaded into main casting to close off the top thereof. The plug 99 has a centrally arranged bore 100 to house a plunger 101 and a spring 102 is arranged inside the plunger and bore to press the shut off member 103 down against the valve seat 104.

When it is desired to by-pass the diaphragm controlled valve, the shut off cock 97 is turned to open position and the fuel can then flow directly through the device without passing through the diaphragm controlled valve or without passing through the strainer. This by-pass operates to permit the fuel to be admitted to the carbureter when the engine is idle for purposes above mentioned.

Figs. 7 to 11, inclusive, illustrate a form of structure in which all the connections, i. e. to fuel line and to the source of fluid pressure, are made at the top of the device. In this case a flat member 105, which may be conveniently made round about a center indicated at 106 in Fig. 7, is employed. The fuel supply inlet is shown at 107 and is in the form of a tapped hole so that the couplings in the fuel line can be connected readily. A tube 108 is threaded into the member 105 from below. This tube is directly underneath the inlet hole 107 and is adapted to carry the fuel to the bottom of a cup or receptacle. This cup is held against packing 109' by a nut 110 threaded onto a boss 110' carried on the underside of a hollow bracket arm 111, which bracket arm is supported from the member 105 in the manner to be now described. The member 105 has an aperture 112 through which the upper end 113 of the bracket 111 passes. The upright portion of the bracket has a collar 114 adapted to fit a recess 115 in the lower surface of the member 105. Threads 116 cooperating with a pair of lock nuts 117 and 118 are shown for the purpose of clamping the bracket 111 to the member 105. A key 119 is provided to aline the parts so that the bracket will be disposed in proper relation relative to the member 105.

The bracket 111 is hollow, as above intimated. It is provided at the top with a threaded hole 120 adapted to receive a coupling to be connected with the source of fluid pressure. The drawing in the present instance shows a form of device for use with a forced feed lubricating system. A passage 121 extends down toward the bottom of the bracket and a horizontal passage 122 communicates with the passage 121. A threaded plug 122' is shown for the purpose of closing off the passage 122.

A pressure responsive element 123, shown in this case in the form of a number of disks made of corrugated sheet metal, is provided with a threaded connection 124 adapted to be threaded into the upper face 125 of the bracket 111. The connection 124 is hollow so as to communicate with the passage 122. The pressure responsive element 123 here shown corresponds with the pressure responsive element 50 shown in Fig. 2 and its operation is broadly the same.

The upper end of the pressure responsive element 123 is adapted, when expanded, to engage with the lower end 126 of a shut off member 127 similar to the shut off member 31 of Fig. 2. It is pressed down against the seat 128 by a spring 129 (see Fig. 8) surrounding a stem 130. This stem passes through a plug 131 threaded into a boss 132 in the upper part of the member 105. A washer 133 is interposed between the upper end of the spring 129 and packing 134 carried in the manner indicated.

The pressure responsive element 123, the shut off member, stem 130 and the parts surrounding the latter, are arranged about an axis 135 offset a short distance from the center 106 of the member 105.

Fig. 10 illustrates, so far as the devices immediately associated with the shut off member 127 is concerned, a structure resembling that shown in Fig. 2. The shut off member 127 is connected with a stem 130 which passes through a packing gland, including plugs 136 and 137 and packing 138. The plug 136 may be threaded at 139 for the purpose of fastening down a bracket 140 similar to the bracket 85 of Fig. 5. As the structure of Fig. 10 is for use with a positive pressure responsive device, a slight change is made in the connections for manually opening the shut off valve. In this case a bell crank member 141 has a bifurcated end 142 to surround the stem 130. A pull on wire 143 will raise the stem 130 and the shut off member off its seat. As the connection between the parts 142 and 130 permits lost motion, the device will operate substantially the same as that indicated in Fig. 5.

The lower face of the member 105 has a flat surface 144 to which a ring 145 is fastened by screws 146. This ring holds a screen 147 in place. The screen extends inwardly, as indicated, across an annular chamber 148 and to cover the lower end of a hollow boss 149. This boss provides a guide for the lower end of the shut off member 127 and has holes 150 to permit the flow of fuel. The devices of Figs. 7 to 10 operate in a manner similar to that of the preceding devices. The fuel is admitted at 107, passes into the bottom of the cup 109 up through the strainer 147, through the apertures 150 under the shut off member 127 (assuming the member to be unseated) into a chamber 151 and through passage 152 to the discharge 153.

It is obvious that a vacuum controlled shut off member similar to or in fact identical with that shown in Fig. 5, could be used in a structure such as shown in Figs. 7 to 10, inclusive, wherein the suction would be applied to the hollow bracket instead of pressure. It is also obvious that the form of packing gland shown in Fig. 8 could be readily substituted for that shown in Figs. 2, 5 or 10. It is also obvious that the form of bypass illustrated in Fig. 6 could be readily applied to the type of structure illustrated in Figs. 5 and 8 to 10, inclusive, or in a vacuum controlled device made along the lines of the structure shown in Fig. 10. It is also obvious that the arrangement, such as illustrated in Fig. 10, for opening the valve manually, could be applied to the structure shown in Fig. 2. A mere suggestion of these changes is believed to be sufficient without illustrating them in detail, especially in view of the fact that the details of any of the organizations suggested are to be found in various figures in the drawings.

Figs. 12 and 13 illustrate a form of device adapted for connection immediately underneath the vacuum tank. A vacuum tank 154 of a type now in general use is provided with a discharge 155 threaded at 156 for connection with the fuel supply line which leads to the carbureter. Instead of connecting directly to the fuel supply line, a shut off cock 157 is connected in the place indicated. The lower end of the shut off cock is connected to a spud 158 which cooperates with a union nut 159 threaded on a boss 160 on a disk like member 161. The disk like member has a depending annular flange 162 threaded as indicated, and a cup or receptacle 163 is threaded in place. A short tube 164 is threaded into the member 161 from underneath so as to provide a continuation for the fuel passage 165. A strainer 166 is held in recess 167 by a split ring 168. The member 163 is provided with a transverse enlargement 169 which has a threaded aperture 170 for the reception of a member 171. The enlargement is hollow as indicated in dotted lines and is provided with tapped holes 172 and 173. Directly underneath the aperture 170 is a valve seat 174.

A shut off member 175 is located in the valve seat 174. This member is connected with a stem or rod 176 by means of a pin 177. A spring 178 is interposed between the top of the shut off member 177 and a washer 179. Suitable packing 180 is interposed to prevent leakage. The stem 176 is loosely connected by a pin 181 to an anchorage 182 supported on a flexible diaphragm 183.

This diaphragm is carried on a ring 184 supported by brackets 185 from the member 171. A suction box 186 is fastened to the ring 184 and diaphragm 183. The suction box is provided with threads 187 for connection by means of tubing to a suitable source of suction. In the present case the most convenient connection would be to the tubing connecting the intake manifold with the top of the vacuum tank.

The device just described is designed for use directly underneath the vacuum tank. The stop cock 157 may be used to close off the flow of fuel when it is desired to empty the cup 163 by removing a plug 188. The fuel flows upwardly through the screen and under the valve, provided it has been opened by the suction produced upon actuation of the engine, and out through one or the other of the passages in the hollow enlargement 169. One end of this enlargement is plugged and the other end is connected to the pipe or tube which leads to the carbureter. The device is therefore adapted to be used with a vacuum tank either on the left hand side or the right hand side of the engine. The union 158—160 is provided so that the parts may be assembled easily and so that the threads may be tightened home with the suction box in the proper position relative to the vacuum tank.

Fig. 14 illustrates a type of device adapted for use inside the vacuum tank. In this case the lower end of the tank is provided with an inwardly directed flange 189 to which is fastened a plate 190 by means of screws 191, packing 192 being interposed to prevent leakage. The plate 190 has a hollow boss 193 threaded for connection with the fuel line and has an upper boss 194 externally threaded at 195 for connection with a frame 196 for purposes to be described. The plate 190 is also provided with another hollow boss 197 for connection with suction line. A hole 198 extends through the plate to connect the boss 197 with a boss 199. Tubing 200 is connected to the boss 199 by an ordinary coupling 201 and to a hollow boss 203 on the upper end of the frame 196 by an elbow 204.

The frame 196 has a threaded ring 202 at the bottom, a number of arms 205 connecting this ring with a large ring 206, spokes 207 connecting the ring 206 with a smaller ring 208, and arms 209 for supporting the boss 203. The bottom of the boss 203 is internally threaded at 210 and a hollow plug 211 is utilized for fastening a pressure responsive device 212 in place. The lower end of the diaphragm 212 is provided with a stem 213 which passes through the ring 208 and which connects through a link 214 with a flap valve 215 pivoted at 216 on the frame 196.

It will be noted that the mechanism just described can be inserted into the vacuum tank from underneath. The flap valve 215 will be held closed by the weight of the fuel above the same.

Reference is now made to Figs. 15, 16, and 17. The top 217 of the vacuum tank resembles in general the top of a vacuum tank now on the market. The supply line from the main tank is brought in over the screen 218, a boss 219 is provided with an aperture 220 so that the fuel may be poured into the tank. The drawing also shows the usual hollow boss 221 for connection with the vacuum line, the hollow boss 222 for connection with the vent pipe, and the usual tube 223 connecting the lower tank with the vented boss 222. It also shows the valve 224 which when opened by the float (not shown) permits vacuum to reach the upper tank and the valve 225 which is opened to break the vacuum in the upper tank and admit air at atmospheric pressure in the well known manner. These devices on the top of a vacuum tank are all in common use and it is believed to be unnecessary to describe them in further detail.

In order to provide connections so that the vacuum can be obtained in the lower tank of the vacuum tank, an enlargement 226 is provided, this enlargement having a passage 227 communicating with the hollow boss 221. The lower surface of the cover 217 is provided with a hollow cone shaped projection 228 to cooperate with a boss 229 having a cone shaped seat 230. The boss 229 is carried on a ring 231 which supports the upper tank (not shown) and the outer or lower tank 232. The ring 231 is also provided with a threaded boss 233 which communicates with the aperture 234 as indicated. Packing 235 and 236 is provided to prevent leakage. The cover 217 and the ring 231 are fastened together by a number of screws 237 in the usual manner.

From the foregoing it will be apparent that the vacuum produced in the intake of the engine is communicated through the passage 227 and 234 into tubing which may be connected to the hollow boss 233. It is contemplated that connection would be made from the boss 233 to a vacuum responsive valve control mechanism carried in the lower part of the vacuum tank; such, for example, as that shown in Fig. 14.

In Fig. 18 an engine 238 is shown. There is illustrated a carbureter 239 having a float chamber 240 and a choke 241, an intake manifold 242, an exhaust manifold 243, cooling fan 245, spark plugs 244, a connection 246 for the cooling water, vacuum tank 247, vacuum line 248 and fuel line 249, other accessories, such as oil pump, water pump, radiator, generator, etc. are not illustrated, but it is understood that the engine will be provided with one or more of these accessories. This figure illustrates the control of the ignition system by an element responsive to the pressure in the lubricating system.

A pressure head 250 provided with a diaphragm 251 is connected into piping 252 of the forced feed lubricating system. The diaphragm is fastened to one end of a lever 253 pivoted at 254 on an arm 255, carried by the pressure head. A contact carrying armature member 256 is pivoted to the other end of the lever 253. A solenoid 257 is suitably connected, as for example; across the starter motor 258 by auxiliary contacts on the starting switch 259, so that the member 256 will be pulled down and the diaphragm expanded when the engine is being started. A manually controlled switch 260 may also be provided to keep the solenoid energized. The ignition circuit includes the battery 261, ignition switch 262, switch 263 having a contact 264 carried on the armature 256, the distributor 265 and spark plugs 244. If for any reason the pressure in the oil circulating system is lost, the diaphragm 251 returns to normal position and the ignition circuit is opened. The engine then stops.

According to the modification illustrated in Fig. 19 a bell crank 266 is mounted on the pressure head 250 and is adapted to engage a collar 267 and thereby move the levers to close switch 264.

Fig. 20 illustrates diagrammatically an engine 268 provided with a carbureter 269, a fuel supply tank 270 and a forced feed lubricating system operated by a pump. As the details of this lubricating system are well known the same is not illustrated in detail. Such systems usually have a tube such as the one illustrated at 271 which extends from the engine casing to a pressure gauge 272 carried on the instrument board. The tubing of the forced feed lubricating system and that of the fuel line may be connected to any of the devices heretofore described for controlling fuel flow from the forced feed lubricating system. Fig. 20, however, illustrates a valve mechanism 273 which is shown in detail in Fig. 21.

The valve mechanism 273 shown in Fig. 21 is connected at one end 274 to the fuel tank by a tube 275 and at the other end 276 to the carbureter by a tube 277 and to the forced feed lubricating system by a tube 278. A casing 279 has a chamber 280, a chamber 281 and a diaphragm 282, and is provided with threads 283 and 284 in the ends 274 and 276 respectively. The lower side of the casing has a boss 285 internally threaded at 286 and in this boss there is threaded a pressure head having a cup-shaped member 287 and a flexible head 288 fastened thereto, as by soldering or brazing. The head 288 is provided with a button 289 and a lock nut 290 is provided so as to affix the member 287 in place. The member 287 is provided with an internally threaded boss 291 for communication with the tube 278. The outside of this boss may be squared so that a wrench can be easily applied for adjusting the member 287 in threads 286. The upper side of the valve casing is provided with an internally threaded boss 292 which cooperates with an externally threaded plug 293, a gasket 294 being provided to prevent leakage. Plug 293 is chambered at 295 to house a plunger 296 pressed downwardly by a spring 297 toward a shut off member 298 carried in a port 299 in the diaphragm 282. The member 298 has an enlarged upper end 300 provided with a central depression 301 to cooperate with rounded lower end of the plunger 296. The valve is therefore self-seating. It may be guided in the port 299 in any suitable manner. The plunger 296 has ports 302 so that movement of the pressure in the fluid will be easy. The upper end of the bottom 289 is disposed a short distance away from the member 298, this distance being regulated by turning the pressure head.

The plunger 296 and shut off member 298 are made of steel or iron and act as a movable armature for solenoid coil 303 carried on the outside of boss 292 and plug 293. The coil is held in place by a nut 304 and washer 305. It is grounded at one side to the valve and at the other side it is connected to the main battery circuit through a wire 306 and switch 307. In order that the valve may always be open to supply fuel when starting, a lead 308 is provided to be connected by auxiliary contacts 309 on the starting switch 310. The valve may be opened by closing the switch 307 to permit fuel to flow and fill the carbureter even though the oil pressure has failed.

Fig. 22 shows mechanical devices associated with the starter switch for mechanically opening valves of the type discussed herein. The push rod 311 which connects the pedal 312 with the bridging member 313 of the starter switch is provided with a collar 314 to engage one arm of a bell crank lever 315 pivoted in a fixed member 316. The other end of the bell crank 315 is connected by a push rod or a wire 317 to mechanism such as is illustrated in Figs. 5, 10 or 19 for mechanically opening the valve or closing the ignition circuit during starting.

Fig. 23 shows a solenoid 318 which may be connected in a circuit in the same manner as solenoid 303 of Fig. 21. The armature 319 is provided at the upper end with a button 320 to hold the armature inside the coil of wire. The other end 321 is apertured to receive a hook 322 carried on the stem 322'. It is contemplated that the coil and armature may be used to electrically open valves having protruding stems such as shown in Figs. 2, 8, 12, 26 or 28. Where it is desired to operate the stem in the other direction, it is obvious that the solenoid and armature could be arranged to pull the armature down instead of up.

In Figs. 24 and 25 the lever 324 for controlling the air choke 325 and the bell crank 141, or 91, respectively, are shown as connected with a boden wire 326. The fuel supply line is shown at 327, the carbureter supply line at 328. The positive pressure or vacuum line connections are shown at 329 and 330. By these devices the valve may be opened during the starting of the engine in order to make certain that there will be fuel in the float chamber.

Fig. 26 shows a modified type of device which is designed to replace the customary shut off valve in the gasoline line without at the same time applying a strainer. A valve casing 331 has a chamber 332 and a chamber 333 and a diaphragm 334 separating the chambers. The casing is provided with internally threaded ends 334' and 335' by which it may be connected into the fuel line through the usual devices. The casing has a boss 335 internally threaded at 336. The diaphragm has a port 337 and a smoothened upper face 338 which may be finished by a tool passed down through the threads 336. A member 339 is threaded into the boss 335 in the manner shown. The member 339 is provided with a number of brackets or arms 340 connected with an upper ring 341 and on this ring is fastened as by bolts 342 a suction box 343 having a suction chamber 344, a flexible head 345 and a threaded boss 346 whereby the suction box may be connected to the vacuum line. The flexible head 345 is connected to devices for actuating a shut off member 347 in the port 337 of the diaphragm 334. These connections include a pin 349 carried in the shut off member, a rod 350 hooked about the pin 349, an apertured button 351 connected to the diaphragm and a locking screw 352 carried by the button. The shut off member has a slotted head to accommodate the hooked end of the rod 350 and a squared lower end 348 carried in the port 337. The shut off member is pressed downwardly by a spring 353 strong enough to close the valve but yet weak enough to be overcome by the suction diaphragm when the engine is in operation. This spring surrounds the rod 350 and is housed in a chamber 354 in the member 339. The upper end of the member 339 has a small aperture in which the rod 350 fits closely. The spring 353 presses a washer 355 against packing 356 in order to prevent leakage about the stem 350. The valve may be manually opened by lifting on the button 351 by inserting the fingers under the diaphragm or by a bell crank similar to that shown in Fig. 10, or a solenoid such as shown in Fig. 23 may be arranged about the stem 350.

In Fig. 27 a conventional float chamber for a carbureter is shown together with suction controlled devices cooperating with the float valve. The float chamber is shown at 357, the float at 358, the float valve at 359 and the valve seat at 360 and the balance weights at 361 pivoted on the usual cover 362. The stem 363 of the float valve projects upwardly through the cover and is provided with a cap 364. A suction box 365 is supported from a ring 366 carried on posts 367 held in place by screws 368, which screws also serve to hold the cover on the float chamber. A diaphragm 369 is interposed between the suction chamber 365 and the ring 366. A spring 370 is adapted to press downwardly on a button 371 preferably carried by the flexible head, and this pressure is transmitted through the valve stem 363 to close the needle 359 against the valve seat 360. An abutment 372 is carried inside the suction box to limit the upward movement of the flexible head. The vacuum line must be connected through the usual coupling device threaded into a hole 373. In order that the action of the spring 370 will be dampened and that the float valve will not be closed with a hammer like blow, the air passage is constricted as shown in 374. In this type of mechanism when the engine is operating the spring 370 will be compressed and the float valve will operate in its usual manner without any interference from the suction controlled mechanism. When, however, the engine stops the spring 370 will expand and will close the valve against the valve seat. This will insure that the valve is properly seated as a much greater force can be applied than is available in the ordinary float mechanism.

Fig. 28 shows a type of device adapted to be inserted just ahead of the carbureter and to use certain parts of the carbureter. The needle of the float valve is indicated at 375, the float chamber at 376, the port carrying plug 377 and the stand pipe 378. These parts and the screen 379 and drain plug 380 are the usual parts of a carbureter. Instead of using a simple universal coupling to be connected with the fuel line there is shown a special coupling member 381 having a valve seat 382, threaded connections 383 for the fuel supply and a threaded boss 384 in which is mounted a threaded plug 385 similar to the plug 339. This plug is adapted to carry a suction box similar to that shown in Figs. 12 or 26. A stem 386 which is connected to the suction box above referred to, passes inside the plug through a guide-plate 387 and is provided with a semi-circular portion 388 to pass about the screen 379. The right end 389 of the stem 386 is pinned to the shut off member 382 as indicated. A washer 390 is fastened to the stem 386 and a spring 391 urges the stem 386 and parts carried thereby toward the right to close the valve. This device may be assembled in place by merely substituting it for the universal coupling ordinarily used. It may be adjusted to any desired angle in the same manner as the universal coupling.

As above intimated, the pressure developed by the water circulating pump might be used as an energy source for operating the devices for discontinuing the operation of the ignition or the fuel supply devices. The structural details of such a system are believed to be obvious from the foregoing. A valve mechanism or a switch operating mechanism like that heretofore shown and described (but with a larger pressure head) could be used. It is also obvious that the ignition circuit could be controlled from a suction head, by merely placing such a head on the opposite side of lever 253.

What is claimed is:

1. In a valve for controlling the flow of fuel, a disk-shaped body having an inlet passage an outlet passage extending to the center of the disk, a port in the lower side of the disk connecting with the outlet passage, a movable closure member carried in the port, means for normally holding said closure member in position to close the port, a depending arm having a passage connected with the inlet passage, a pressure responsive diaphragm supported from the arm and associated with the closure member to open the valve, a cup-shaped member enclosing the arm and diaphragm, the passage in the arm opening into the cup, and means to clamp the cup against the lower side of the disk.

2. In a valve for controlling the flow of fuel, a disk-shaped body having an inlet passage, an outlet passage extending to the center of the disk, a port in the lower side of the disk connecting with the outlet passage, a movable closure member carried in the port, means for normally holding said closure member in position to close the port, a depending arm having a passage connected with the inlet passage, a pressure responsive diaphragm supported from the arm and associated with the closure member to open the valve, a cup-shaped member enclosing the arm and diaphragm, the passage in the arm opening into the cup, means to clamp the cup against the lower side of the disk, and a strainer through which liquid must flow upwardly in passing into said port.

3. In a valve for controlling the flow of fuel, a disk-shaped body having an inlet passage, an outlet passage extending to the center of the disk, a port in the lower side of the disk connecting with the outlet passage, a movable closure member carried in the port, means for normally holding said closure member in position to close the port, a depending arm having a passage connected with the inlet passage, a pressure responsive diaphragm supported from the arm and associated with the closure member to open the valve, a cup-shaped member enclosing the arm and diaphragm, the passage in the arm opening into the cup, means to clamp the cup against the lower side of the disk, and a plunger for closing the inlet passage upon the removal of the cup.

4. In a valve mechanism of the class described, a flexible diaphragm for opening the valve, a spring for normally closing the valve, manually operable means for opening the valve, a cup underneath the valve and surrounding the diaphragm, and a strainer interposed between the cup and valve.

5. A valve mechanism for controlling the fuel flow for an internal combustion engine comprising, a normally open pressure responsive valve having manual means for opening it, a self-cleaning strainer, a strainer cup, and an automatic valve which closes upon the removal of the strainer cup.

6. In combination, an internal combustion engine having lubricating and cooling appliances, ignition devices, a carburetor, fuel supply devices for the carburetor, an electric starting system for the engine, a device responsive to the discontinuance of the operation of the engine, or the discontinuance of the functioning of one of the said appliances for discontinuing the operation of one of said devices, and electromagnetic devices energized when the starter is in operation for rendering the last mentioned device non-functioning.

7. In combination, an internal combustion engine having lubricating appliances, and ignition devices, a carburetor, fuel supply devices for the carburetor, an electric starting system for the engine, a device responsive to the discontinuance of the functioning of the said lubricating appliances for discontinuing the operation of the fuel supply devices, and electromagnetic devices energized when the starter is in operation for rendering the last mentioned device non-functioning.

8. The combination with an internal combustion engine having a pump operated lubricating system, a pump operated cooling system, an electric starting system for the engine, fuel supply devices, and ignition devices, of a device responsive to the loss of pressure in one of said pump operated systems for discontinuing the operation of one of said devices, and electromagnetic devices, energized when the starter is in operation for rendering the last mentioned device non-functioning.

PETER J. SCHWALBENBERG.